(12) United States Patent
Lieberman et al.

(10) Patent No.: US 7,302,156 B1
(45) Date of Patent: Nov. 27, 2007

(54) OPTICAL SYSTEM

(75) Inventors: Klony Lieberman, Jerusalem (IL); Yossi Chay, Tel Aviv (IL); Yuval Sharon, Jerusalem (IL)

(73) Assignee: Lumio Inc., Menlo Park ( * ) Notice: Subject to any disclaimer, the term of this patent is extended or adjusted under 35 U.S.C. 154(b) by 0 days.

(21) Appl. No.: 11/691,508

(22) Filed: Mar. 27, 2007

Related U.S. Application Data

(60) Provisional application No. 60/819,891, filed on Jul. 12, 2006, provisional application No. 60/832,508, filed on Jul. 24, 2006, provisional application No. 60/827,223, filed on Sep. 28, 2006, provisional application No. 60/889,746, filed on Feb. 14, 2007.

(51) Int. Cl.
*G02B 6/10* (2006.01)
*G06F 3/042* (2006.01)

(52) U.S. Cl. .............. 385/146; 385/123; 385/901; 345/173; 345/175; 345/176

(58) Field of Classification Search .......... 385/146; 345/175, 176
See application file for complete search history.

(56) References Cited

U.S. PATENT DOCUMENTS

| | | | |
|---|---|---|---|
| 5,257,340 A | 10/1993 | Kaplan | |
| 5,295,047 A | 3/1994 | Windross | |
| 5,905,583 A | 5/1999 | Kawai et al. | |
| 5,969,343 A * | 10/1999 | Nakamura et al. | 250/227.31 |
| 6,783,269 B2 | 8/2004 | Pashley et al. | |
| 6,910,783 B2 * | 6/2005 | Mezei et al. | 362/615 |

* cited by examiner

*Primary Examiner*—Frank G. Font
*Assistant Examiner*—Ryan Lepisto

(57) ABSTRACT

An optical system including at least one optical fiber having a core and cladding, the at least one optical fiber having a cross section defining a circumference, the at least one optical fiber having at least one light scattering discontinuity at least one location therealong, the at least one optical fiber having optical power at least one light transmissive region having a focus located in proximity to the discontinuity, the at least one light scattering discontinuity having an angular extent of less than ten percent of the circumference and the at least one light transmissive region having an angular extent of more than 25% of the circumference and a light source arranged for directing light along the at least one optical fiber.

7 Claims, 5 Drawing Sheets

OPTICAL SYSTEM

REFERENCE TO RELATED APPLICATIONS

Reference is made to U.S. Provisional Patent Application Ser. No. 60/827,223, filed Sep. 28, 2006 and entitled "OPTICAL SENSING SYSTEM," the disclosure of which is hereby incorporated by reference and priority of which is hereby claimed pursuant to 37 CFR 1.78(a) (4) and (5)(i).

Reference is made to U.S. Provisional Patent Application Ser. No. 60/819,891, filed Jul. 12, 2006 and entitled "LOW PROFILE TRIANGULATION AND SYSTEMS CALIBRATION METHOD," the disclosure of which is hereby incorporated by reference. Reference is made to U.S. Provisional Patent Application Ser. No. 60/832,508, filed Jul. 24, 2006 and entitled "ACCUMULATOR BASED TRIANGULATION FOR TRACKING MULTIPLE EVENTS," the disclosure of which is hereby incorporated by reference. Reference is made to U.S. Provisional Patent Application Ser. No. 60/889,746, filed Feb. 14, 2007 and entitled "TRIANGULATION WITH ENHANCED RESOLUTION," the disclosure of which is hereby incorporated by reference.

FIELD OF THE INVENTION

The present invention relates generally to optical systems which include optical fibers and more particularly to touch screens and optical fiber assemblies useful therein.

BACKGROUND OF THE INVENTION

The following U.S. patent publications are believed to represent the current state of the art: U.S. Pat. Nos. 6,783,269; 5,257,340; 5,905,583 and 5,295,047.

SUMMARY OF THE INVENTION

The present invention seeks to provide an improved optical system employing an optical fiber.

There is thus provided in accordance with a preferred embodiment of the present invention an optical system including at least one optical fiber having a core and cladding, the at least one optical fiber having a cross section defining a circumference, the at least one optical fiber having at least one light scattering discontinuity at least one location therealong, the at least one optical fiber having optical power at least one light transmissive region having a focus located in proximity to the discontinuity, the at least one light scattering discontinuity having an angular extent of less than ten percent of the circumference and the at least one light transmissive region having an angular extent of more than 25% of the circumference and a light source arranged for directing light along the at least one optical fiber.

Preferably, the optical power of the at least one optical fiber at the at least one light transmissive region and the at least one light scattering discontinuity are operative to direct light, received from the light source along the at least one optical fiber and scattered by the at least one light scattering discontinuity, directly from the at least one discontinuity through the cladding, generally in a plane extending in a direction generally away from the at least one discontinuity. Additionally, the at least one light transmissive region is located generally opposite the at least one light scattering discontinuity about the circumference of the at least one optical fiber.

Preferably, the at least one optical fiber extends along at least most of a periphery of a light curtain area and the at least one light scattering discontinuity extends along the periphery, directing light generally in a plane, filling the interior of the periphery and thereby defining a light curtain therewithin. Additionally, the optical system also includes at least one light curtain impingement sensor operative to sense impingement of the light curtain and to produce impingement output signals including two-dimensional impingement location information and output signal processing circuitry for providing an output indication of a two-dimensional impingement location.

Preferably, the at least one optical fiber extends along at least most of a periphery of a light curtain area and the at least one light scattering discontinuity includes a plurality of light scattering discontinuities distributed along the periphery, whereby the plurality of light scattering discontinuities direct light generally in a plane, filling the interior of the periphery and thereby together defining a light curtain therewithin.

Preferably, light scattering functionality of the at least one discontinuity varies along the length of the at least one optical fiber to provide compensation for attenuation produced by the optical fiber. Additionally, the optical power of the at least one optical fiber at the at least one light transmissive region and the at least one light scattering discontinuity having varying light scattering functionality being operative to direct light, received from the light source along the at least one optical fiber and scattered by the at least one light scattering discontinuity, directly from the at least one discontinuity through the cladding, generally in a plane extending in a direction generally away from the at least one discontinuity and having generally uniform intensity.

Preferably, the at least one optical fiber has a non-spherical cross section and the at least one discontinuity is located precisely at a focus of the at least one light transmissive region. Additionally, the optical power of the at least one optical fiber having a non-spherical cross section and the at least one light transmissive region and the at least one light scattering discontinuity located precisely at the focus of the at least one light transmissive region being operative to direct light, received from the light source along the at least one optical fiber and scattered by the at least one light scattering discontinuity, directly from the at least one discontinuity through the cladding, generally in a plane of uniform thickness extending in a direction generally away from the at least one discontinuity.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
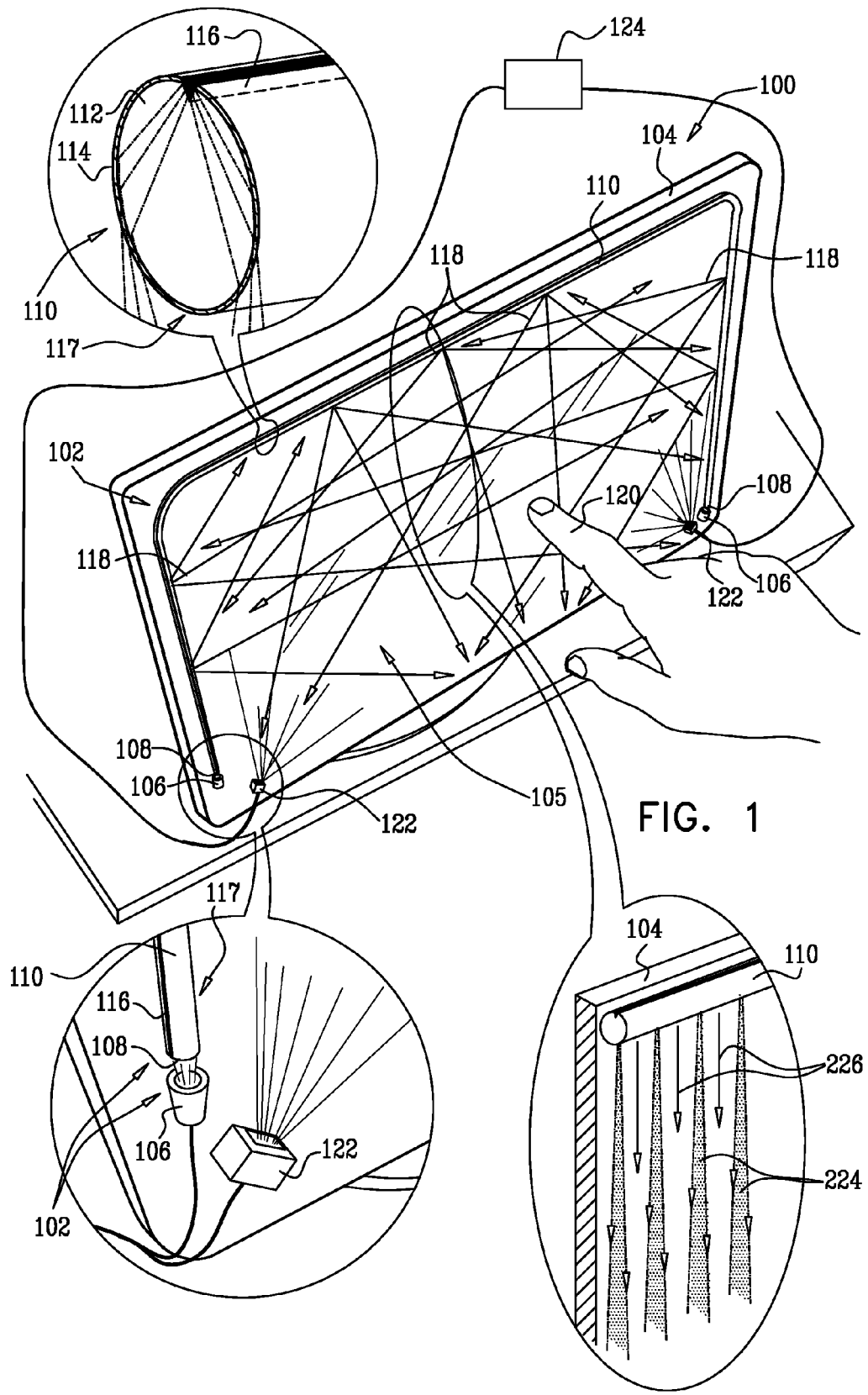
FIG. 1 is a simplified illustration of a touch screen constructed and operative in accordance with a preferred embodiment of the present invention.

Reference is now made to FIG. 1, which illustrates an optical system, here shown in the form of a touch screen 100, constructed and operative in accordance with a preferred embodiment of the present invention. As seen in FIG. 1, the touch screen 100 comprises an optical fiber illumination assembly 102 which is preferably arranged along and above all or part of the periphery of a support 104, typically a glass plate. Alternatively, the glass plate may be obviated and the support 104 may be a frame (not shown). Typically, the optical fiber illumination assembly 102 extends along three of four edges of a generally planar detection region 105.

In accordance with a preferred embodiment of the present invention, the optical fiber illumination assembly 102 receives illumination from light sources 106, such as an LED or a diode laser, and preferably an infrared laser or LED, disposed at each end 108 of assembly 102. Alternatively, a single light source 106 may be employed, disposed at one end 108 of the assembly 102.

In accordance with a preferred embodiment of the present invention, the optical fiber illumination assembly 102 comprises at least one optical fiber 110 having a core 112 and cladding 114, such as an ESKA plastic optical fiber commercially available from Mitsubishi, which has a circular cross section. The cladding 114 preferably has at least one light scattering discontinuity 116 at least one location therealong, preferably opposite at least one light transmissive region 117 of the optical fiber 110, at which region the optical fiber 110 has optical power.

In the illustrated embodiment, discontinuity 116 is preferably defined by forming a scratch extending entirely through the cladding 114 along at least a substantial portion of the entire length of the optical fiber illumination assembly 102. The scratch may, but need not necessarily, penetrate into the core 112.

In accordance with a preferred embodiment of the present invention, the at least one light scattering discontinuity 116 is operative to scatter light which is received from the light source 106 and passes along the at least one optical fiber 110. The optical power of the optical fiber 110 at the at least one light transmissive region 117 collimates and directs the scattered light through the cladding 114 along a direction generally away from the discontinuity 116, as indicated generally by reference numeral 118. It is appreciated that generally every location in generally planar detection region 105 receives light generally from every location along the at least one light transmissive region 117.

In accordance with a preferred embodiment of the present invention, the at least one optical fiber 110 extends generally continuously along a periphery of a light curtain area defined by the detection region 105 and the at least one light scattering discontinuity 116 extends generally continuously along the periphery, directing light generally in a plane, filling the interior of the periphery and thereby defining a light curtain therewithin.

In an alternative embodiment, the at least one optical fiber 110 extends along a periphery of a light curtain area defined by the detection region 105 and the at least one light scattering discontinuity 116 includes a plurality of separate light scattering discontinuities distributed along the periphery, whereby the plurality of light scattering discontinuities direct light generally in a plane, filling the interior of the periphery and thereby together defining a light curtain therewithin.

Impingement of a finger or stylus 120 upon support 104 preferably is sensed by one or more light detectors 122, preferably disposed along an edge of detection region 105 along which the optical fiber illumination assembly 102 does not extend. The detectors detect changes in the light received from the optical fiber illumination assembly 102 produced by the presence of a finger or stylus 120 in the detection region 105. Preferably, detectors 122 are located in the same plane as the optical fiber illumination assembly 102. Preferably, two detectors are sufficient to detect a finger or stylus 120 anywhere in the detection region 105, each detector being located at an adjacent corner of the detection region 105 and having at least 90 degree coverage, as shown.

Preferably, detectors 122 are each linear CMOS sensors, such as an RPLIS-2048 linear image sensor commercially available from Panavision SVI, LLC of One Technology Place, Homer, N.Y., which are suitable for use in triangulation. The outputs of detectors 122 are supplied to detection circuitry 124, such as that described in assignee's U.S. Published Patent Application 2006/0187198 and U.S. Provisional Applications 60/819,891; 60/832,508 and 60/889, 746, the disclosures of which are hereby incorporated by reference, which provides an output indication of the two dimensional location of the finger or stylus 120 impingement in the detection region 105.

Reference is now made additionally to FIGS. 2A, 2B, 2C and 2D, which are each a simplified, partially sectional, partially pictorial illustration of a portion of an optical fiber assembly useful in the touch screen of FIG. 1.

Figure 2B:
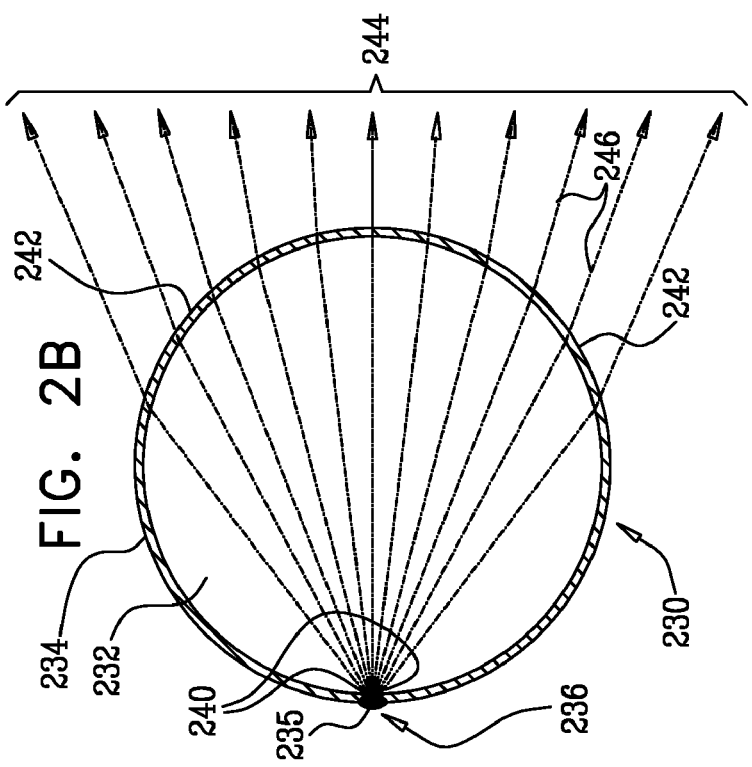
FIGS. 2A, 2B, 2C and 2D are each a simplified, partially sectional, partially pictorial illustration of a portion of an optical fiber assembly useful in the touch screen of FIG. 1.
Figure 2A:
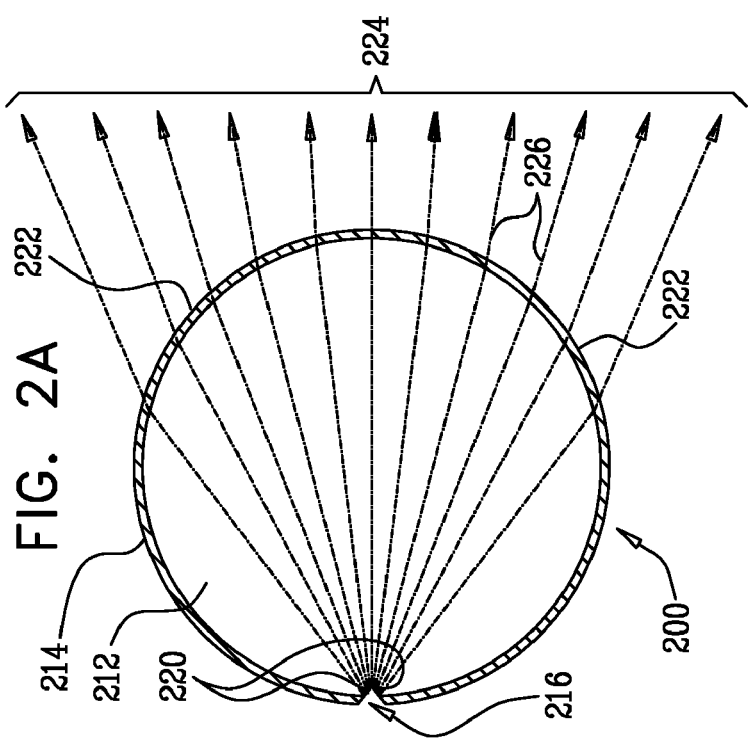

FIG. 2A illustrates the use of a conventional optical fiber 200 having a circular cross section, a core 212 and cladding 214, such as an ESKA plastic optical fiber commercially available from Mitsubishi, having a discontinuity 216 in the form of a longitudinal scratch which extends through cladding 214 and penetrates core 212. In this case, the surfaces 220 defined by the scratch scatter light in the core. A curved light transmissive region 222 lying opposite the discontinuity 216 has optical power and acts generally to collimate the scattered light, as shown, in a plane 224 extending in a direction, indicated by arrows 226, away from the discontinuity 216.

FIG. 2B illustrates the use of a conventional optical fiber 230 having a circular cross section, a core 232 and cladding 234, such as an ESKA plastic optical fiber commercially available from Mitsubishi, having a discontinuity 236 in the form of a longitudinal scratch which extends through cladding 234 which may but need not necessarily penetrate core 232. In this case, a light scattering material 235, such as white paint, fills at least part of the longitudinal scratch and this material 235 as well as the surfaces 240 defined by the scratch scatter light. A curved cross sectional surface 242 lying opposite the discontinuity 236 has optical power and acts generally to collimate the scattered light, as shown, in a plane 244 extending in a direction, indicated by arrows 246, away from the discontinuity 236.

It is a particular feature of the present invention that the light scattering discontinuity has an angular extent of less than ten percent, and more preferably less than one percent, of the circumference of the fiber and that the at least one light transmissive region has an angular extent of more than 25% of that circumference. This feature provides a light curtain of generally uniform thickness.

Figure 2D:
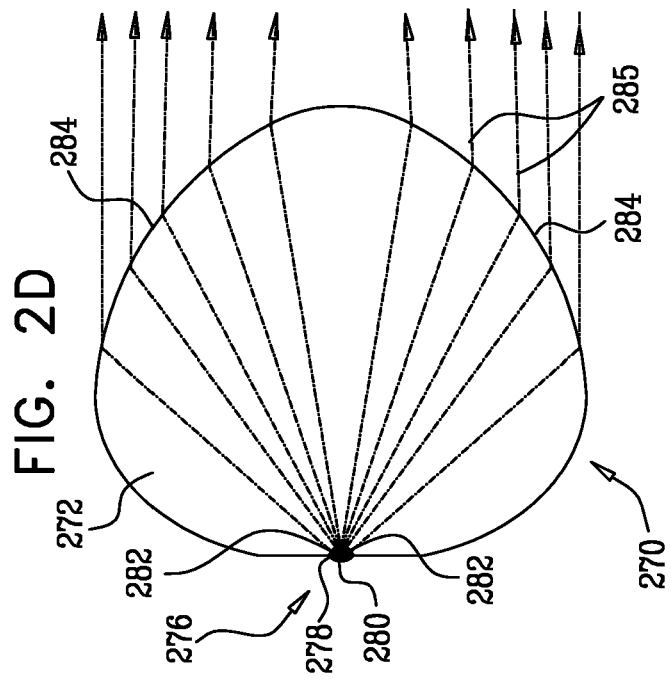
Figure 2C:
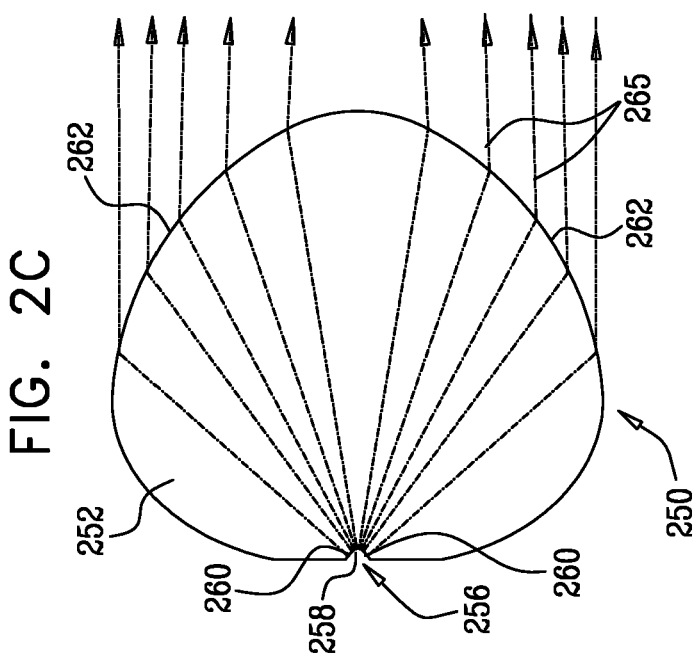

FIG. 2C illustrates the use of a non-conventional optical light guide 250 having a aspheric cross section 252, having a discontinuity 256 in the form of a longitudinal scratch located at a focus 258 of the aspheric cross section 252. In this case, the surfaces 260, defined by the scratch, scatter light. A curved light transmissive region 262 lying opposite the discontinuity 256 has optical power and acts to collimate the scattered light, as shown, to a generally parallel beam in a direction, indicated by arrows 265, away from the discontinuity 256. It is appreciated that cladding (not shown) may be provided peripherally of the light guide 250.

FIG. 2D illustrates the use of a non-conventional optical light guide 270 having a aspheric cross section 272, having a discontinuity 276 in the form of a longitudinal scratch located at a focus 278 of the aspheric cross section 272. In this case, a light scattering material 280, such as white paint, fills at least part of the longitudinal scratch and this material 280 as well as the surfaces 282 defined by the scratch scatter light. A curved light transmissive region 284 lying opposite the discontinuity 276 has optical power and acts to collimate the scattered light, as shown, to a generally parallel beam in a direction, indicated by arrows 285, away from the discontinuity 276. It is appreciated that cladding (not shown) may be provided peripherally of the light guide 270.

It is a particular feature of the present invention that the light scattering discontinuity has an angular extent of less than ten percent, and more preferably less than one percent, of the circumference of the fiber and that the at least one light transmissive region has an angular extent of more than 25% of that circumference. This feature provides a light curtain of generally uniform thickness. Due to the cross-sectional configuration of the optical light guides 250 and 270, wherein the discontinuities 256 and 276 are located precisely at the respective foci of the light transmissive regions 252 and 272, a light curtain of highly uniform thickness may be realized.

Figure 3:
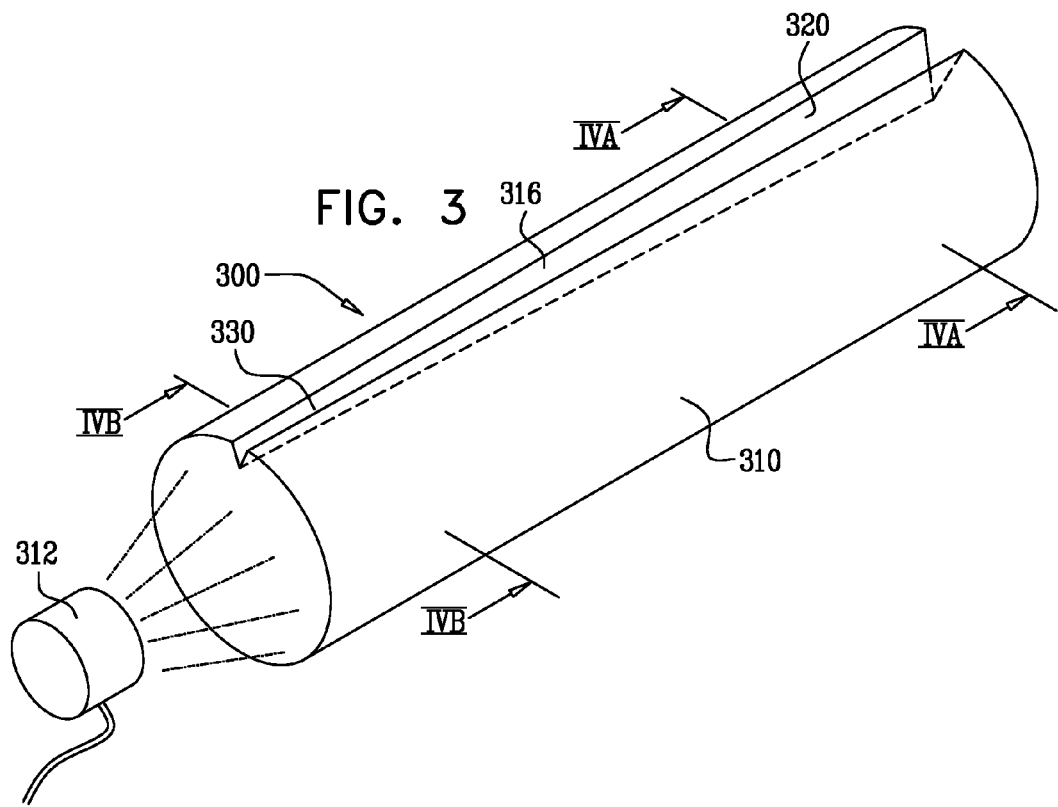
FIG. 3 is a simplified illustration of an optical fiber assembly structure useful in the touch screen of FIG. 1 and providing attenuation compensation.
Figure 4A:
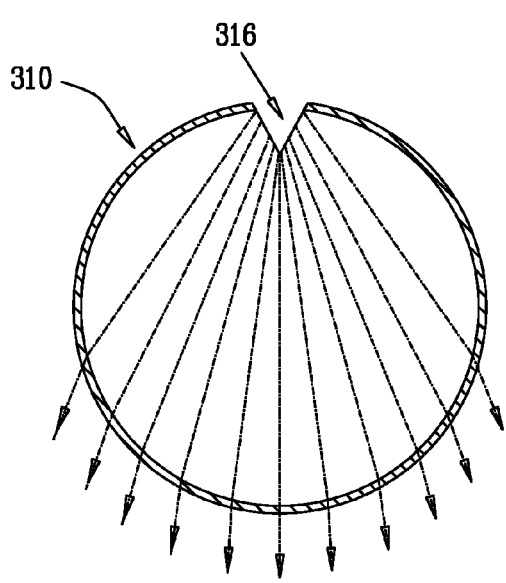
FIGS. 4A and 4B are simplified sectional illustrations of the optical fiber assembly structure of FIG. 3, taken along respective lines IVA-IVA and IVB-IVB.
Figure 4B:
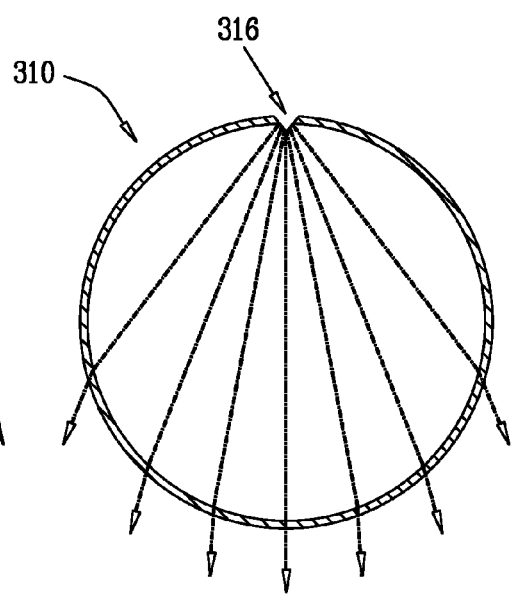

Reference is now made to FIGS. 3, 4A and 4B, which are simplified illustrations of an optical fiber assembly structure 300 useful in the apparatus of FIG. 1 and providing attenuation compensation. An optical fiber 310 is associated at one end thereof with a light source 312. One or more discontinuities 316 are formed in the optical fiber 310, as generally described hereinabove. It is seen in FIG. 3 that the discontinuity 316 may have different depth or width at differing locations along the fiber 310. For example, a portion 320, shown in FIG. 4A, of discontinuity 316 at a location relatively far from the light source 312 is seen to be of greater width and depth than a portion 330, shown in FIG. 4B, of discontinuity 316 at a location relatively close to the light source 312.

Figure 5:
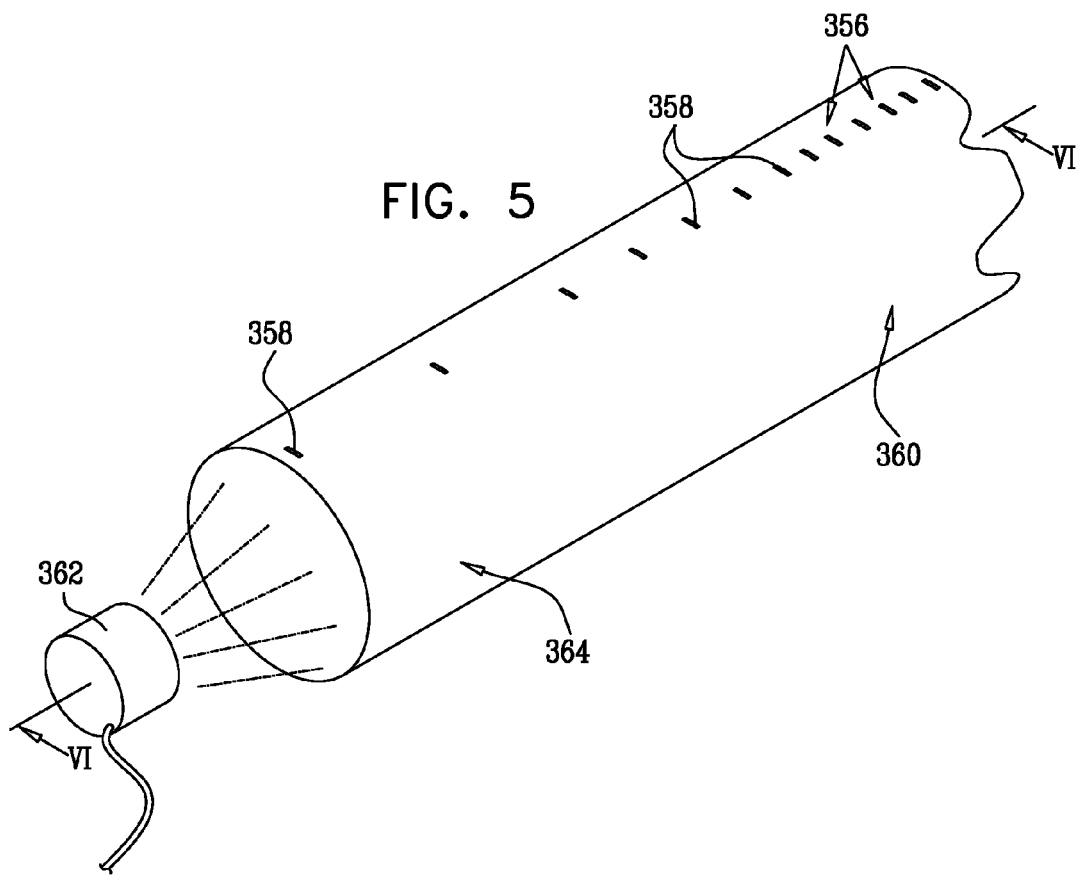
FIG. 5 is a simplified illustration of another optical fiber assembly structure useful in the touch screen of FIG. 1 and providing attenuation compensation.
Figure 6:
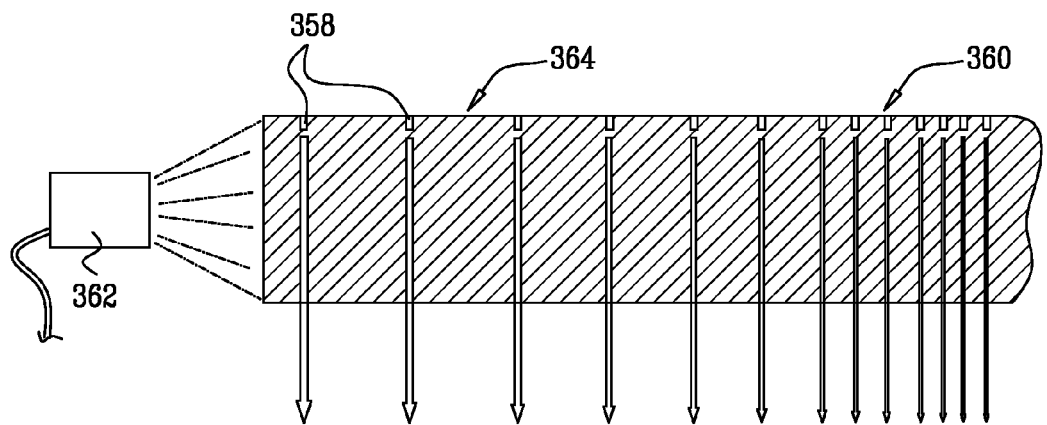
FIG. 6 is a simplified sectional illustration of the optical fiber assembly structure of FIG. 5, taken along respective lines VIA-VIA.

Alternatively or additionally, as shown in FIGS. 5 and 6, a discontinuity 356 may be composed of mutually spaced discrete discontinuity portions 358, whose density is seen to be greater at locations 360 relatively far from a light source 362 than at locations 364 relatively close to light source 362.

The result of the variation in the discontinuities, such as discontinuities 316 and 356, over the length of the fiber is that attenuation of light traveling along the fiber from the light source at an end of the fiber is compensated such that a generally uniform level of illumination is produced along the length of the illuminating region of the optical fiber assembly structure.

It will be appreciated by persons skilled in the art that the present invention is not limited by what has been particularly shown and described hereinabove. Rather the scope of the present invention includes both combinations and sub-combinations of features recited in the claims as well as modifications thereof which would occur to a person of ordinary skill in the art upon reading the foregoing and which are not in the prior art.

The invention claimed is:

1. An optical system comprising:

at least one optical fiber having a core and cladding, said at least one optical fiber extending along at least most of a periphery of a light curtain area, said at least one optical fiber having a cross section defining a circumference, said at least one optical fiber having at least one light scattering discontinuity at at least one location therealong, said at least one optical fiber having optical power at at least one light transmissive region having a focus located in proximity to said discontinuity, said at least one light scattering discontinuity extending along said periphery, said at least one light scattering discontinuity having an angular extent of less than ten percent of said circumference and said at least one light transmissive region having an angular extent of more than 25% of said circumference; and a light source arranged for directing light along said at least one optical fiber, said optical power of said at least one optical fiber at said at least one light transmissive region and said at least one light scattering discontinuity being operative to direct light, received from said light source along said at least one optical fiber and scattered by said at least one light scattering discontinuity, directly from said at least one discontinuity through said cladding, generally in a plane extending in a direction generally away from said at least one discontinuity, filling the interior of said periphery and thereby defining a light curtain therewithin.

2. An optical system according to claim 1 and also comprising at least one light curtain impingement sensor operative to sense impingement of said light curtain and to produce impingement output signals including two-dimensional impingement location information and output signal processing circuitry for providing an output indication of a two-dimensional impingement location.

3. An optical system according to claim 1 and wherein light scattering functionality of said at least one discontinuity varies along the length of said at least one optical fiber to provide compensation for attenuation produced by said optical fiber.

4. An optical system according to claim 3 and wherein said optical power of said at least one optical fiber at said at least one light transmissive region and said at least one light scattering discontinuity having varying light scattering functionality being operative to direct light, received from said light source along said at least one optical fiber and scattered by said at least one light scattering discontinuity, directly from said at least one discontinuity through said cladding, generally in a plane extending in a direction generally away from said at least one discontinuity and having generally uniform intensity.

5. An optical system according to claim 1 and wherein said at least one optical fiber has a non-spherical cross section and said at least one discontinuity is located precisely at a focus of said at least one light transmissive region.

6. An optical system according to claim 5 and wherein said optical power of said at least one optical fiber having a non-spherical cross section and said at least one light transmissive region and said at least one light scattering discontinuity located precisely at said focus of said at least one light transmissive region being operative to direct light, received from said light source along said at least one optical fiber and scattered by said at least one light scattering discontinuity, directly from said at least one discontinuity through said cladding, generally in a plane of uniform thickness extending in a direction generally away from said at least one discontinuity.

7. An optical system comprising:
at least one optical fiber having a core and cladding, said at least one optical fiber extending along at least most of a periphery of a light curtain area, said at least one optical fiber having a cross section defining a circumference, said at least one optical fiber having at least one light scattering discontinuity at least one location therealong, said at least one optical fiber having optical power at least one light transmissive region having a focus located in proximity to said discontinuity, said at least one light scattering discontinuity including a plurality of light scattering discontinuities distributed along said periphery, said at least one light scattering discontinuity having an angular extent of less than ten percent of said circumference and said at least one light transmissive region having an angular extent of more than 25% of said circumference; and a light source arranged for directing light along said at least one optical fiber, said optical power of said at least one optical fiber at said at least one light transmissive region and said plurality of light scattering discontinuities being operative to direct light, received from said light source along said at least one optical fiber and scattered by said at least one light scattering discontinuity, directly from said at least one discontinuity through said cladding, generally in a plane extending in a direction generally away from said at least one discontinuity, filling the interior of said periphery and thereby together defining a light curtain therewithin.

* * * * *